United States Patent
Hepper

(10) Patent No.: US 11,294,983 B2
(45) Date of Patent: *Apr. 5, 2022

(54) INFERRED USER IDENTITY IN CONTENT DISTRIBUTION

(71) Applicant: International Business Machines Corporation, Armonk, NY (US)

(72) Inventor: Stefan Hepper, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/685,268

(22) Filed: Nov. 15, 2019

(65) Prior Publication Data
US 2020/0089718 A1 Mar. 19, 2020

Related U.S. Application Data

(63) Continuation of application No. 13/154,402, filed on Jun. 6, 2011, now Pat. No. 10,509,841.

(51) Int. Cl.
*G06F 16/95* (2019.01)
*G06F 16/957* (2019.01)
*G06F 16/335* (2019.01)

(52) U.S. Cl.
CPC .......... *G06F 16/957* (2019.01); *G06F 16/337* (2019.01)

(58) Field of Classification Search
CPC .............................. G06F 16/957; G06F 16/337
See application file for complete search history.

(56) References Cited

U.S. PATENT DOCUMENTS

| | | | | |
|---|---|---|---|---|
| 5,961,593 A | * | 10/1999 | Gabber | G01M 13/021 370/329 |
| 7,356,569 B1 | | 4/2008 | Kembel | |
| 7,421,645 B2 | | 9/2008 | Reynar | |
| 8,176,159 B2 | * | 5/2012 | Kashi | H04L 9/3226 709/223 |
| 10,019,708 B2 | | 7/2018 | Agarwal | |
| 2001/0054155 A1 | * | 12/2001 | Hagan | H04L 69/329 713/193 |
| 2002/0152237 A1 | | 10/2002 | Cohen | |

(Continued)

*Primary Examiner* — Eliyah S. Harper
(74) *Attorney, Agent, or Firm* — Fabian VanCott; Steven L. Nichols

(57) ABSTRACT

Embodiments of the present invention provide a method, system and computer program product for inferred user identity in content distribution. In an embodiment of the invention, a method for inferred user identity in content distribution includes retrieving a set of data of a particular classification from a data store of a computing device of an unidentified user requesting access to content in a content distribution system. The method further includes comparing the set of data of the particular classification to known patterns of data of the particular classification corresponding to different known users. The method yet further includes inferring an identity of the unidentified user based upon at least a partial matching of the compared set of data of the particular classification and known patterns of data of the particular classification. Finally, the method includes managing user interactions of the unidentified user based upon the inferred identity.

17 Claims, 2 Drawing Sheets

(56) References Cited

U.S. PATENT DOCUMENTS

| | | | |
|---|---|---|---|
| 2005/0022013 A1* | 1/2005 | Schwenk | G06F 16/9535 |
| | | | 726/4 |
| 2006/0069749 A1* | 3/2006 | Herz | G06F 16/9535 |
| | | | 709/219 |
| 2007/0038436 A1* | 2/2007 | Cristo | G06F 40/232 |
| | | | 704/9 |
| 2008/0059474 A1* | 3/2008 | Lim | G06F 21/316 |
| 2008/0177994 A1* | 7/2008 | Mayer | G06F 9/4418 |
| | | | 713/2 |
| 2008/0200153 A1 | 8/2008 | Fitzpatrick | |
| 2008/0209229 A1 | 8/2008 | Ramakrishnan | |
| 2009/0234711 A1 | 9/2009 | Ramer | |
| 2009/0249198 A1 | 10/2009 | Davis | |
| 2009/0288140 A1* | 11/2009 | Huber | H04L 63/0853 |
| | | | 726/2 |
| 2010/0268720 A1 | 10/2010 | Spivack | |
| 2011/0022681 A1 | 1/2011 | Sinneonov | |
| 2011/0047484 A1* | 2/2011 | Mount | G06Q 10/10 |
| | | | 715/753 |
| 2011/0087679 A1 | 4/2011 | Rosato et al. | |
| 2011/0191664 A1 | 8/2011 | Sheleheda | |
| 2012/0079442 A1 | 3/2012 | Akar | |
| 2012/0260214 A1* | 10/2012 | Krishnamurthy | |
| | | | H04N 21/44222 |
| | | | 715/811 |
| 2017/0243028 A1* | 8/2017 | LaFever | G06F 21/6263 |

\* cited by examiner

INFERRED USER IDENTITY IN CONTENT DISTRIBUTION

CROSS-REFERENCE TO RELATED APPLICATIONS

This application is a Continuation of U.S. patent application Ser. No. 13/154,402, filed Jun. 6, 2011, the entirety of which is incorporated herein by reference.

BACKGROUND OF THE INVENTION

Field of the Invention

The present invention relates to user authentication in content distribution and more particularly to identifying a user accessing distributed content over a computer communications network.

Description of the Related Art

The growth of the Internet largely can be attributed to the desire for remotely disposed individuals to share content. Long before the development of the hypertext transfer protocol (HTTP) and the World Wide Web, academics, bureaucrats and private individuals indexed and exchanged content over the Internet. The explosion of Internet use following the development of the World Wide Web, however, has resulted in a vast sea of content leading to creation by necessity of advanced content searching applications used almost universally by all users of the Internet today.

Content can be characterized as passive or active. Passive content refers to content able only to be perceived (viewed in a visual mode, or heard in an audible mode, by way of example) while active content permits user interactivity with the content. The venerable Web based form represents a traditional form of interactive content in which content is presented in a Web page along with one or more input fields such as text input fields, radio buttons, check boxes, drop down boxes, and the like, into which an end user can provide information to be received and processed by back end programmatic logic.

In the case of a Web site providing passive content, oftentimes it is desirable to customize the passive content or arrangement of the passive content in the Web site according to the identity of the end user viewing the Web site. For example, an e-commerce site might prefer presenting products known to be of interest to a viewing end user. In the case of a Web site providing active content, it is just as desirable to customize the interactions with the Web site, for example by pre-populating fields of a form with information known to be associated with an interacting end user. Of note, customization of Web site content can be provided in connection with the degree to which a viewing end user is authorized to interact with particular content on the Web site.

Of note, irrespective of the passive or active nature of content in a Web site, many Web sites provide for progressively different disclosures of content based upon how certain a viewing end user can be identified. Also known as "step-up authentication", a Web site utilizing step-up authentication can attempt to identify an end user through the use of cookies or flash files in which user credentials are stored, the manual provision by the end user of credentials in a log-in screen, the provision of a certificate, or the provision of biometric data, to name a few examples. Cookies and flash files also have proven helpful in the field of Web site analytics in tracking the browsing behavior of the end user in interacting with the content of a Web site.

However, cookies and flash files are limited to the relationship between the computing device storing the cookie or flash file and the computing device used to attempt access to the secure content. Consequently, when attempting access to a Web site from a computing device that differs from the computing device in which the cookie or flash file is stored, manual identification and authentication of the end user will be required. Further, even where a single device is used both to store a cookie or flash file and to access the Web site, many end users frequently direct the periodic removal of cookies and other temporary files so as to require the later re-identification and authentication of the end user.

BRIEF SUMMARY OF THE INVENTION

Embodiments of the present invention address deficiencies of the art in respect to user identification for Web site content access and provide a novel and non-obvious method, system and computer program product for inferred user identity in content distribution. In an embodiment of the invention, a method for inferred user identity in content distribution includes retrieving a set of data of a particular classification from a data store of a computing device of an unidentified user requesting access to content in a content distribution system. The method further includes comparing the set of data of the particular classification to known patterns of data of the particular classification corresponding to different known users. The method yet further includes inferring an identity of the unidentified user based upon at least a partial matching of the compared set of data of the particular classification and known patterns of data of the particular classification. Finally, the method includes managing user interactions of the unidentified user based upon the inferred identity.

In one aspect of the embodiment, the particular classification is previously visited Web sites, and optionally previously visited Web sites at particular times. In another aspect of the embodiment, the particular classification is addresses of previously connected computers. In yet another aspect of the embodiment, the particular classification is previously locations of the computing device, optionally at particular times. Of note, managing user interactions of the unidentified user based upon the inferred identity can include tracking user behavior accessing content in the content distribution system in connection with the inferred identity. Alternatively, managing user interactions of the unidentified user based upon the inferred identity can include limiting access to content in the content distribution system according to the inferred identity.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodi

DETAILED DESCRIPTION OF THE INVENTION

Embodiments of the invention provide for inferred user identity in content distribution. In accordance with an embodiment of the invention, a connection can be received for a content server distributing content over a computer communications network from an end user at a computing device. A data store disposed within the computing device can be accessed and data residing in the data store can be classified, for example according to different locations of the computing device at particular times, different Web sites visited through one or more content browsers of the computing device, or the identities of other computing devices to which the computing device has communicatively connected to previously. The classified data subsequently can be processed to infer an identity of the end user. Thereafter, the actions of the end user can be managed in association with the inferred identity without requiring the use of cookies, flash files, manual authentication or biometric identification methods. The management of the actions of the end user, for example, can include the recording of interactions by the end user with content provided by the content server, or the restricting or permitting of access by the end user to content provided by the content server.

Figure 1:
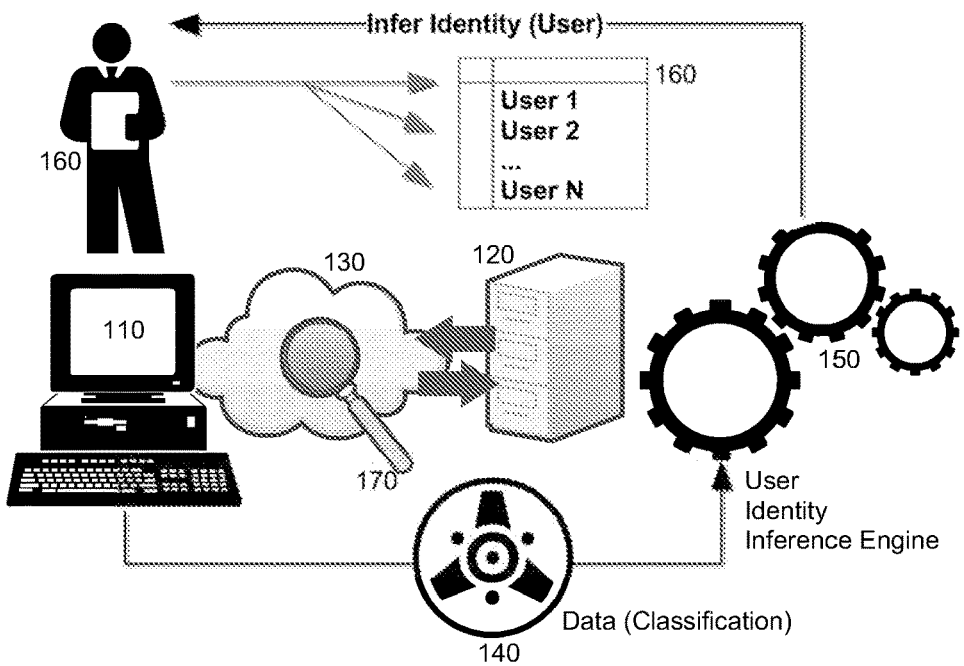
- FIG. 1 is a pictorial illustration of a process for inferred user identity in content distribution.

In further illustration, FIG. 1 pictorially shows a process for inferred user identity in content distribution. As shown in FIG. 1, an end user 160 can access a content distribution system 120 by way of a computing device 110 over computer communications network 130. User identity inference engine 150 can access the computing device 110 to retrieve data 140 of a particular classification, such as different locations of the computing device at particular times, whether set forth explicitly by the computing device, or implicitly by associating the device with a particular location of a cellular telephone tower, different Web sites visited through one or more content browsers of the computing device, or the identities of other computing devices to which the computing device has communicatively connected to previously. Thereafter, the user identity inference engine 150 can infer the identity of the end user 160 by matching the data 140 of particular classification to a user in a table of known users 160. In this way, the identity of the end user 160 can be inferred without requiring the use of cookies, flash files, manual authentication or biometric identification methods.

Figure 2:
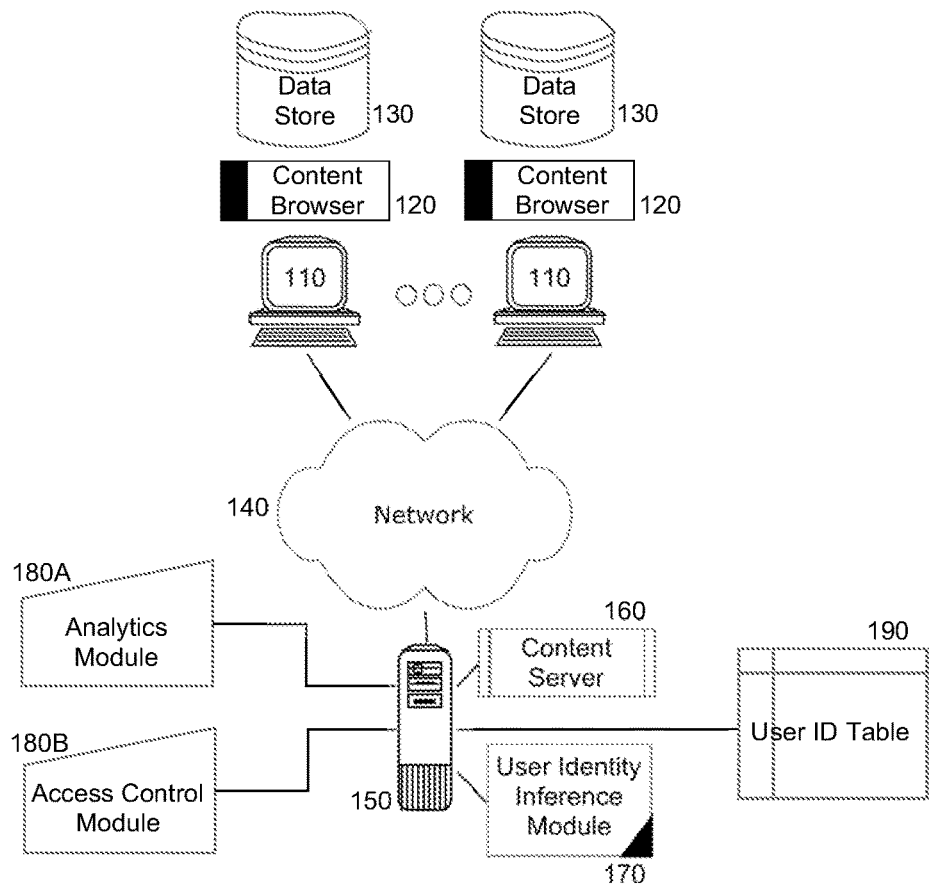
FIG. 2 is a schematic illustration of a content distribution data processing system configured in inferred user identity; and, FIG. 3 is a flow chart illustrating a process for inferred user identity in content distribution.

The process described in connection with FIG. 1 can be implemented in a content distribution data processing system. In yet further illustration, FIG. 2 schematically shows a content distribution data processing system configured in inferred user identity. As shown in FIG. 2, a host computer 150 can be configured for communicative coupling to different computing devices 110 over a computer communications network 140. The computing devices 110, which can include personal computers, personal digital assistants, mobile telephones, and computers embedded as part of consumer appliances, to name a few examples, each can support the execution of one or more content browsers 120 and can include at least one corresponding data store 130, such as a hard disk drive, flash memory, solid state memory and the like.

The host computer 150 can support the execution of a content server 150 configured to serve content over the computer communications network 140 to requesting ones of the content browsers 120. Optionally, the content browsing behavior of end users access content served by the content server 160 can be computed by analytics module 180A. As a further option, in servicing requests from the content browsers 120, the content server 160 can control access to content served by the content server 160 by way of an access control module 180B in accordance with an identity of an end user requesting access to the content.

In support of the analytics module 180A and/or the access control module 180B, a user identity inference module 170 can execute in memory by at least one processor of the host computer 150. The user identity inference module 170 can include program code that when executed by the host computer 150, can infer an identity of a user requesting access to the content server 160 without requiring the use of cookies, flash files, manual authentication or biometric identification methods. In this regard, the program code can be enabled to respond to a request to access the content server 160 from a content browser 120 executing in a corresponding computing device 110 by retrieving data of a particular classification from the corresponding computing device 110 and mapping the data of the particular classification to a known user in a user identity table 190.

For example a list of retrieved Web sites visited by the content browser 120 at particular times of the corresponding computing device 110 can be compared to a known pattern of visited Web sites at particular times of a known user in the user identity table 190. As another example, a list of previously connected computers (by way of IP address, for instance) at particular times can be compared to a known list of previously connected computers at particular times of a known user in the user identity table 190. As yet another example, a list of geographic locations and particular times for the corresponding computing device 110 can be compared to a known list of previous geographic locations and particular times of a known user in the user identity table 190.

Figure 3:
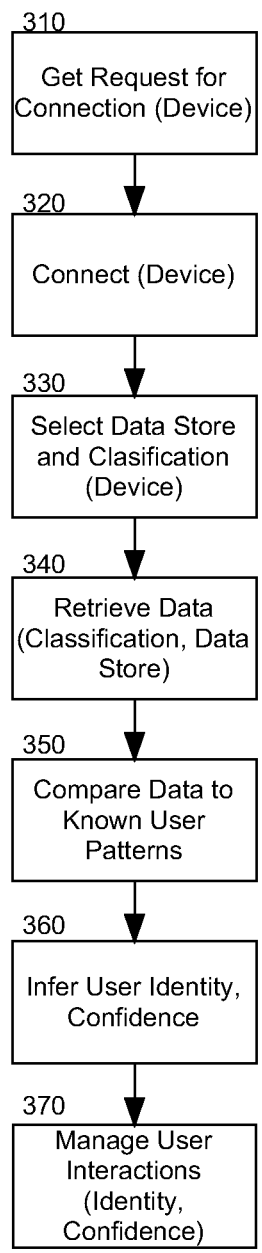

In even yet further illustration of the operation of the user identity inference module 170, FIG. 3 is a flow chart illustrating a process for inferred user identity in content distribution. Beginning in block 310, a request can be received from a computing device to access content at a content server. In block 320, a communicative connection can be established with the computing device and in block 330 a data store in the computing device can be selected as can a classification of interest for data in the data store. In block 340, data according to the selected classification can be retrieved from the data store and in block 350 the retrieved data can be compared to known patterns of data associated with different known users. In block 360 an identity of a user issuing the request can be inferred based upon the comparison of known patterns. Further, a degree of confidence in the inference can be computed according to the degree to which the retrieved data compares to the known patterns. Finally, in block 370 user interactions with the content server can be managed in respect to the inferred identity and computed confidence, such as be limiting access by the user to particular content provided by the content server, or by tracking and analyzing content browsing behavior of the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A method for inferred user identity in content distribution, the method comprising:
   accessing by a content server, a data store in a computing device of an unidentified end user that is requesting access to content in the content server from over a computer communications network;
   retrieving from the data store of the computing device by the content server during the accessing of the data store a set of data describing different interactions between the computing device and different computers other than the content server;
   determining from the set of data once retrieved from the data store a pattern of utilization of the computing device comprising a set of multiple different interactions between the computing device and individual ones of the different computers at respectively different times;
   in response to the determination of the pattern of utilization, comparing the identified pattern of utilization to multiple different known patterns of utilization corresponding to different known, previously identified users;
   on condition that the identified pattern of utilization at least partially matches one of the multiple different known patterns, inferring an identity of the unidentified end user as one of previously identified users associated with the partially matched one of the multiple different known patterns of data; and,
   managing user interactions of the unidentified user based upon the inferred identity.

2. The method of claim 1, wherein the multiple different known patterns of utilization comprise a listing of different ones of the different computers and corresponding times of access in connection with one of the previously identified users comprises a listing of previously visited Web sites at particular times.

3. The method of claim 1, wherein the multiple different known patterns of utilization comprise a listing of different ones of the different computers and corresponding times of access in connection with one of the previously identified users comprises a listing of addresses of previously connected computers.

4. The method of claim 1, wherein the multiple different known patterns of utilization comprise a listing of different ones of the different computers and corresponding times of access in connection with one of the previously identified users comprises a listing of previous geographic locations of the computing device during the corresponding times of access.

5. The method of claim 1, wherein the inferring occurs on condition that the identified pattern of utilization at least partially matches one of the multiple different known patterns with a computed degree of confidence.

6. The method of claim 1, wherein managing user interactions of the unidentified user based upon the inferred identity comprises tracking user behavior accessing content in the content distribution system in connection with the inferred identity.

7. The method of claim 1, wherein managing user interactions of the unidentified user based upon the inferred identity comprises limiting access to content in the content distribution system according to the inferred identity.

8. The method of claim 5, wherein managing user interactions of the unidentified user based upon the inferred identity comprises limiting access to content in the content distribution system according to the inferred identity and the computed degree of confidence.

9. A computer program product for inferred user identity in content distribution, the computer program product comprising:
   a non-transitory computer readable storage medium having computer readable program code embodied therewith, the computer readable program code comprising:
   computer readable program code for retrieving from a data store of a computing device that is requesting access to content in a content server and by the content server during the accessing of the data store a set of data describing different interactions between the computing device and different computers other than the content server;
   computer readable program code for determining from the set of data once retrieved from the data store a pattern of utilization of the computing device comprising a set of multiple different interactions between the computing device and individual ones of the different computers at respectively different times;
   computer readable program code for, in response to the determination of the pattern of utilization, comparing the identified pattern of utilization to multiple different known patterns of utilization corresponding to different known, previously identified users;
   computer readable program code for, on condition that the identified pattern of utilization at least partially matches one of the multiple different known patterns, inferring an identity of the unidentified end user as one of previously identified users associated with the partially matched one of the multiple different known patterns of data; and,
   computer readable program code for managing user interactions of the unidentified user based upon the inferred identity.

10. The computer program product of claim 9, wherein the multiple different known patterns of utilization comprise a listing of different ones of the different computers and corresponding times of access in connection with one of the previously identified users comprises a listing of previously visited Web sites at particular times.

11. The computer program product of claim 9, wherein the multiple different known patterns of utilization comprise a listing of different ones of the different computers and corresponding times of access in connection with one of the previously identified users comprises a listing of addresses of previously connected computers.

12. The computer program product of claim 9, wherein the multiple different known patterns of utilization comprise a listing of different ones of the different computers and corresponding times of access in connection with one of the previously identified users comprises a listing of previous geographic locations of the computing device during the corresponding times of access.

13. The computer program product of claim 9, wherein managing user interactions of the unidentified user based upon the inferred identity comprises tracking user behavior accessing content in the content distribution system in connection with the inferred identity.

14. The computer program product of claim 9, wherein managing user interactions of the unidentified user based upon the inferred identity comprises limiting access to content in the content distribution system according to the inferred identity.

15. A content distribution data processing system comprising:
   a content server executing in memory by at least one process of a host computer; and,
   a user identity inference module comprising program code configured upon execution in the host computer to:
      access by a content server, a data store in a computing device of an unidentified end user that is requesting access to content in the content server from over a computer communications network,
      retrieve from the data store of the computing device by the content server during the accessing of the data store a set of data describing different interactions between the computing device and different computers other than the content server,
      determine from the set of data once retrieved from the data store a pattern of utilization of the computing device comprising a set of multiple different interactions between the computing device and individual ones of the different computers at respectively different times,
      in response to the determination of the pattern of utilization, compare the identified pattern of utilization to multiple different known patterns of utilization corresponding to different known, previously identified users,
      on condition that the identified pattern of utilization at least partially matches one of the multiple different known patterns, infer an identity of the unidentified end user as one of previously identified users associated with the partially matched one of the multiple different known patterns of data, and
      manage user interactions of the unidentified user based upon the inferred identity based upon the inferred identity.

16. The system of claim 15, wherein the multiple different known patterns of utilization comprise a listing of different ones of the different computers and corresponding times of access in connection with one of the previously identified users comprises a listing of previously visited Web sites at particular times.

17. The system of claim 15, wherein the multiple different known patterns of utilization comprise a listing of different ones of the different computers and corresponding times of access in connection with one of the previously identified users comprises a listing of previous geographic locations of the computing device during the corresponding times of access.

* * * * *